United States Patent [19]

Winters et al.

[11] 3,715,266

[45] Feb. 6, 1973

[54] WIRE REINFORCED RUBBER PRODUCT

[75] Inventors: Michael E. Winters, Dallas, Tex.; Wyong S. Han, Roseville, Mich.

[73] Assignee: Uniroyal Inc., Detroit, Mich.

[22] Filed: Aug. 25, 1971

[21] Appl. No.: 174,985

[52] U.S. Cl. .................161/140, 156/330, 161/57, 161/143, 161/144, 161/175, 260/836, 260/837
[51] Int. Cl. .............................................B29h 17/28
[58] Field of Search........161/57, 140, 143, 144, 175; 156/325, 330; 260/836, 837

[56] References Cited

UNITED STATES PATENTS 3,298,417  1/1967  Keefe ....................................161/60

*Primary Examiner*—William A. Powell
*Assistant Examiner*—James J. Bell
*Attorney*—J. King Harness et al.

[57] ABSTRACT

In a steel wire reinforced rubber tire or other metal reinforced rubber containing product, a technique of utilizing special adhesive component materials in the rubber to achieve unexpectedly strong adherence between the contacting surfaces of the reinforcing metal and the rubber.

9 Claims, No Drawings

WIRE REINFORCED RUBBER PRODUCT

BACKGROUND OF THE INVENTION

This invention broadly relates to rubber containing products and the method of making same. More specifically this invention relates to steel wire reinforced rubber tires and like products and a method of making steel wire reinforced rubber products.

The state of the art is indicated by the following references which are cited here of record: U.S. Pat. Nos. 3,018,027; 3,097,109; 3,097,110; 3,097,111; 3,171,821; 3,503,845; 3,517,722; 3,256,137; 1,883,973; 2,240,805; and, "Milestones in Elastomer-to-Metal Bonding," Part one, by F. H. Sexsmith, published in Adhesives Age, May 1970 issue, at pages 21–26; "Study of the Adhesion to Brass-Plated Steel Cable" Bekaert Seminar held in Herstal on Jan. 9, 1969; "Steel Cord" Bekaert Seminar at Zwevegm on Nov. 28, 1968 (Dec. 12, 1968). The above reference disclosures are hereby incorporated into this disclosure by reference.

One object of this invention is to provide an improved rubber containing product wherein metal reinforcement means associated with the rubber product are strongly adhered to the rubber.

Another object of the present invention is to provide an improved rubber containing product which possesses an adhesive system which provides very strong adhesion between the rubber and steel reinforcing wires which give added strength to the rubber product.

Another object of the present invention is to provide a product which possesses an adhesive system which provides strong adhesion between rubber and steel wires, for example blends of natural and synthetic rubbers and brass, bronze, or copper plated wires.

Another object of the present invention is to provide a rubber product which includes special adhesive components which act to provide extremely strong adhesion between blends of natural and synthetic rubbers which make up the product and brass, bronze, or copper plated metal reinforcing means within the product.

Another object of the present invention is to provide an improved rubber containing product which utilizes special adhesive component materials that do not result in any adverse effect on the properties of the raw and cured rubber such that the adhesive bond which is formed between the metal and rubber is not only very strong but also highly resistive to heat aging.

Another object of the present invention is to provide a method of making a rubber containing product wherein the product is reinforced with metal or wire means and wherein the rubber is adhesively bonded to the metal reinforcing means to form a very strong bond therebetween.

Other objects, features, and advantages of the present invention will become apparent from the subsequent description and the appended claims.

SUMMARY OF THE INVENTION

It is not understood why the invention works as it does to give such highly satisfactory results and the theory underlying the invention is still being studied to get an explanation for the invention. Suffice it to say however that rubber containing products, which are reinforced with wire or metal means, can be obtained with this invention wherein the metal is adhered to or within the rubber by a uniquely strong bond (with the adhesion being measured for example under test procedure ASTM–D–2229). Because of this it is believed that the invention is very desirable and advantageous for commercial application.

In one aspect, briefly stated, the present invention comprises a steel wire reinforced rubber tire, of a radial and/or belted tire construction, comprising: a rubber portion, wire means for reinforcing the rubber portion and including at least one metal surface on the wire means, an adhesive component in the rubber to promote adhesion between said metal surface and the rubber, said adhesive component consisting essentially of, (a) methylene acceptor-methylene donor resin reaction product adhesive, and (b) epoxy resin adhesive and epoxy resin curative reaction product, said adhesive component being present in an amount between about 0.1 to about 20 parts per 100 parts of rubber.

From a method aspect, briefly stated, the present invention comprises a method of making a steel wire reinforced rubber tire, of radial and/or belted tire construction, comprising: providing a rubber formulation which includes therein an adhesive component consisting essentially of: (a) methylene acceptor-methylene donor resin system adhesive, and (b) epoxy resin adhesive and epoxy resin curative system, bringing wire means for reinforcing the rubber into contact with the rubber which includes said adhesive components (a) and (b), and curing the rubber formulation over said wire means at an effective curing temperature within the range of about 220° to 425° F.

DESCRIPTION OF PREFERRED EMBODIMENTS

This invention is believed to possess particularly attractive applications for use in steel wire reinforced rubber tires. Other important applications outside of tire technology exist in the preparation of metal reinforced belting, hoses, and the like. Furthermore, other types of rubber-like products which are to be reinforced with metal may make very useful application of this invention.

The rubber used in the present invention for making the products referred to herein may be selected from a wide variety of types. The rubber or rubber-like material referred to herein can also satisfactorily be characterized as an elastomeric material. The rubber may be natural (Hevea) rubber or conjugated diolefine polymer synthetic rubber or mixtures of any of them including their reclaims. Such conjugated diolefine polymer synthetic rubbers are polymers of butadienes-1,3, e.g. butadiene-1,3, isoprene, 2,3,- dimethyl-butadiene-1,3, and mixtures thereof and polymers of mixtures of such butadienes-1,3, and with up to 50 percent of such mixtures of compounds which contain a vinyl type group and which are copolymerizable with butadienes-1,3, e.g. where at least one of the disconnected valences is attached to an electronegative radical, that is a radical which increases the polar character of the molecule, such as vinyl, phenyl, nitrile, or carboxy radicals. Examples of such conjugated diolefine polymer synthetic rubbers are polybutadiene, polyisoprene, butadiene-styrene copolymers (SBR) and butadiene-acrylonitrile copolymers. The rubber will also contain conventional compounding and vulcanizing ingredients such as carbon black, rubber processing or softening oils which may be added as such or may be present from oil-extended rubbers, antioxidants, sulfur, zinc oxide and accelerators. In reference to the rubber products and rubber formulations referred to herein, unless otherwise stated the amounts of the various ingredients used are normally stated in parts by weight used per 100 parts by weight of rubber(phr).

The wire or metal reinforcing means referred to herein may be of a number of different types. Normally the reinforcing means would be one or more wires which may be oriented in either parallel, a crisscross mesh orientation, or the like to reinforce the rubber product. The wire or metal may also be plated with a compatible metal such as bronze, brass, copper, or other metal. The wire or metal reinforcing means referred to is normally steel but other metals may be used. In a preferred aspect the reinforcing means would be a steel wire plated with copper, brass, or bronze. The wire may vary widely in diameter for example from 0.001 up to about 1 inch or more in diameter depending on the type of rubber product which is being reinforced. In preferred aspects of the invention the wire would normally have a diameter within the range of about 0.005 up to about three-sixteenth inches in diameter. The particular adhesive system discovered and disclosed herein should be selected such that it is compatible with the wire or metal reinforcing means which is used.

The special adhesive component material used herein which has been discovered to produce such highly satisfactory results in accordance with this invention is composed of: (a) a methylene acceptor-methylene donor resin reaction product adhesive, and (b) an epoxy resin adhesive and an epoxy resin curative reaction product. The adhesive component (a) and (b) should generally be present in the rubber containing product in an amount between about 0.1 to about 20 parts per 100 parts of rubber or rubber-like material; and, preferably it should be present within the range of about 2 up to about 12 parts per 100 parts rubber. The ratio of adhesive component (a) to adhesive component (b) should generally be within the range of about 95:5 to about 5:95 on a weight basis and preferably this ratio should be maintained within the range of about 75:25 to about 25:75, with best results being obtained when the ratio is maintained at about 50:50.

The methylene acceptor-methylene donor resin reaction adhesive for use herein includes a methylene acceptor of meta-disubstituted benzene wherein the substitutents are selected from at least one of the group consisting of OH, $NH_2$, $OCOCH_3$; and the methylene donor is selected from at least one of the group consisting of N-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted -1 - aza- 3,7 - dioxabicyclo [3.3.0]octane, trimeric methyleneamino acetonitrile, and an azomethine of the general formula

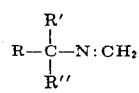

wherein R, R' and R'' are lower alkyl ($C_1$—$C_9$) radicals. There are a number of different such methylene acceptor-methylene donor resin reaction product adhesives which can be satisfactorily used herein. However the preferred such adhesive is a resorcinol formaldehyde type resin adhesive and a methylene donor selected from the above group. Numerous types of methylene acceptor-methylene donor resin reaction product adhesives are disclosed in U.S. Pat. No. 3,097,111.

The epoxy resin adhesive for use herein should be an epoxy resin having a molecular weight between about 200 and about 3000 and an epoxide equivalent between about 130 and about 2000; and, preferably this molecular weight should be within the range of about 200 to about 2000 and the epoxide equivalent should be within the preferred range of about 130 and about 1200. Examples of such epoxy resins are Epon Resin 812 (Shell Chemical Company), a mixture of di- and tri-epoxides prepared by the condensation of epichlorohydrin and glycerin. This material has an epoxide functionality of 2.2, about 10 percent tightly bound chlorine, an average molecular weight of about 306, an equivalent weight (g. resin to esterify one mole of acid) of 65, and a viscosity at 25° C of 0.9–1.5 poises. Others include those derived from bisphenol A, e.g., Epon 1002, Epon 1004 (Shell Chemical Company)and Araldite 6084 (Ciba Co.); epoxylated novolaks, e.g., ECN 1299 epoxy creasol novolak (Ciba Co.); and, Kopox 995A and Kopox 997A which have molecular weights of 885 and 1270, respectively (Koppers Co.).

The epoxy resin curative used to form the epoxy adhesive reaction product may be any suitable material for use as an epoxy curative however in particular the epoxy resin curative should normally be a nitrogen containing epoxy resin curative. Examples of epoxy resin curatives for use herein are di-aminodiphenylmethane, ethylenediamine, diethylenetriamine, triethylenetetramine, tetraethylenepentamine, piperdine, acrylonitrile-amine adducts, other amine adducts, nitrogen containing aromatic compounds, aromatic epoxy curatives, and anhydride epoxy curatives. A discussion of suitable epoxy resin curatives appears in the test "Epoxy Resnis" by Irving Skeist, published by Reinhold, 1958, at Chapter 3 thereof.

In accordance with this invention it is possible to make a steel wire reinforced rubber tire or other similar products by providing a rubber formulation which includes the adhesive components (a) and (b) as described above and then bringing wire or metal means for reinforcing the product into contact with the rubber portion thereof which includes the adhesive components and then curing the rubber material over the metal reinforcing means, with the curing being carried out for example at an effective curing temperature within the range of about 220° F up to about 425° F (preferably about 275° – 375° F). Steel wire reinforced rubber tires are highly desirable commercial products and this invention is markedly advantageous in improving such products because of the unique adhesion which is obtained between the wire or metal reinforcing means and the rubber.

In order to further illustrate the invention, the following Examples are provided. It is to be understood, however, that the Examples are included for illustrative purposes and are not intended to be limiting of the scope of the invention as set forth in the subjoined claims.

EXAMPLES 1 AND 2

| Base Recipe (all natural rubber formulation) | phr | |
|---|---|---|
| Natural Rubber (N.R.) | 100.00 | |
| HAF Black | 15.00 | carbon black filler |
| FEF Black | 15.00 | carbon black filler |
| Act. Zinc Oxide | 10.00 | |
| Stearic Acid | 2.00 | |
| PBNA | .50 | antioxidant, phenyl beta naphthalene |
| BLE | 5.00 | antioxidant, diphenyl amine - acetone, reaction product |
| Pine Tar Oil | 4.00 | |
| SNS | .50 | accelerator, m-tertiary butyl-2-benzyl thiazole sulfeneamide |

| Additional Compounding Ingredients | Ex. 1 | Ex. 2 |
|---|---|---|
| Resin 1587 | 2.80 | 2.80 |
| GDUE | 1.45 | 1.45 |
| ECN 1299 | 5.0 | 5.0 |
| TONOX | 1.0 | 1.0 |
| Flowers of Sulfur | 3 | 2 |

Bead Wire Adhesion for [2 inches thick rubber product sample, cured at approximately 293° F, for approximately 45 minutes, ASTM-D-2229 test, result expressed in pounds] (Copper plated steel wire 0.037 inch diameter)

| Adhesion Strength (lbs.) | Ex. 1 | Ex. 2 |
|---|---|---|
| Green pulled at 250° F | 232 | 224 |
| Aged** | 220 | 216 |

**Aged 24 hours at 250° F in air oven

Resin 1587 is a resorcinol formaldehyde resin of the methylene acceptor type available from Schenectady Chemicals Inc. of Schenectady, New York.

GDUE is 1-aza-3,7-dioxa-5-hydroxymethyl-bicyclo-3,3,0 octane. This GDUE material acts as a methylene donor.

ECN-1299 is an epoxy cresol novalak resin available from Ciba Co.

TONOX (trademark of Uniroyal, Inc.) is di-amino-diphenylmethane. This material acts as an epoxy resin curative.

EXAMPLES 3 AND 4

| Base Recipe (blended rubber formulation) | phr | |
|---|---|---|
| Natural Rubber | 35 | |
| Cis-Polybutadiene | 20 | |
| SBR 8214 - elastomer | 67.5 | (23.5 Oil) - styrene-butadiene rubber |
| FEF Black | 22.5 | |
| HAF Black | 35 | |
| Activated Zinc Oxide | 5 | |
| Stearic Acid | 1 | |
| PTR Resin 100, tackifier | 6 | aromatic petroleum hydrocarbon resin |
| Tackifier Resin CR 8787 | 2 | fully reacted phenolic type resin (not an adhesive component) |
| ENSO, antioxidant | 1 | n-isopropyl-n-phenyl-p-phenylene diamine |
| BLE | 2 | |
| CBS, accelerator | .8 | n-cyclohexyl-2-benzothiazole-sulfeneamide |
| DPG - secondary accelerator | .25 | diphenyl guanidine |
| Sulfur | 3.25 | |

| Adhesives Added | phr | |
|---|---|---|
| | Ex. 3 | Ex. 4 |
| Resin 1587 | 2.4 | 1.5 |
| GDUE | 1.2 | - |
| NMP (2-nitro-2-methyl propanol) | - | 1.5 |
| Resin ECN-1299 | 5 | 5 |
| TONOX | 1.8 | 1.8 |

The steel wire cable used was a brass plated steel cable 1 × 5 × 0.0098 inch, a Bekaert product. The plate brass contains 65 to 75 percent copper and the total weight of copper was 4 to 8 grams per 1 kg of cable.

A test sample consisted of a 1 inch × ½ inch × ½ inch rubber block and a 6 inch cable, one end of which, 1 inch long, was embedded in the rubber. The samples were cured 45 minutes at 293° F.

The cable was pulled out from the rubber at 250° F using an Instron tester. Force required to pull the cable out of the rubber (expressed in pounds) is the adhesion strength between the rubber and the cable.

| Adhesion Strength (lbs.) | Ex. 3 | Ex. 4 |
|---|---|---|
| Unaged Sample | 73.1 | 54.1 |
| Aged Samples (1 inch thick) | 59.8 | 46.4 |

EXAMPLE 5

The same base recipe was used as in Examples 3–4 and the same testing procedure was used as in Examples 3–4. The purpose of this Example 5 is to show the variation in the adhesion strength test result when the cure temperature and time duration of cure are varied:

| Additives Added | phr | |
|---|---|---|
| Resin 1587 | 1.2 | |
| GDUE | .6 | |
| Resin ECN 1299 | 2.5 | |
| TONOX | .9 | |
| Cure Temperature | 293° F | 350° F |

| Adhesion Strength (lbs.) of the Sample (1 inch thick) Cured for: | | |
|---|---|---|
| 10 minutes | - | 58.4 |
| 20 minutes | - | 59.8 |
| 30 minutes | 74.0 | 61.1 |
| 45 minutes | 77.6 | - |
| 60 minutes | 72.1 | - |

EXAMPLES 6 AND 7

The same base recipe was used as in Example 3, however, the rubber polymer blend was changed from that shown in the base recipe to determine the test result obtainable with different rubber polymer blends. The adhesion strength test result was measured in the same fashion as in Examples 3–4.

| Polymers | phr | |
|---|---|---|
| | Ex. 6 | Ex. 7 |
| NR | 50 | 70 |
| Cis-BR (polybutadiene) | 15 | - |
| Emulsion BR | - | 30 |
| SBR-8214 | 35 | - |
| Adhesives Added | | |
| Resin 1587 | 2.4 | 2 |
| GDUE | 1.2 | 1 |
| Resin ECN 1299 | 5 | 5 |
| TONOX | 1.25 | 1.25 |
| Adhesion Strength (lbs.) with Sample Rubber | | |

| Thickness ½ inch | 37.3 | 32.7 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A steel wire reinforced rubber tire, of a radial or belted tire construction,
   comprising:
   a rubber portion,
   wire means for reinforcing the rubber portion and including at least one metal surface on the wire means,
   an adhesive component in the rubber to promote adhesion between said metal surface and the rubber, said adhesive component consisting essentially of,
      a. methylene acceptor-methylene donor resin reaction product adhesive, and
      b. epoxy resin adhesive and epoxy resin curative reaction product,
   said adhesive component being present in an amount between about 0.1 to about 20 parts per 100 parts of rubber.

2. The invention of claim 1 wherein,
   said adhesive component (a) includes a methylene acceptor of metadisubstituted benzene wherein the substitutents are selected from the group consisting of OH, $NH_2$, and $OCOCH_3$,
   and a methylene donor selected from the group consisting of N-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted-1-aza-3,7-dioxabicyclo[3.3.0]octane, trimeric methyleneamino acetonitrile, and an azomethine of the general formula

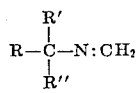

wherein R, R' and R'' are lower alkyl ($C_1$—$C_8$) radicals.

3. The invention of claim 1 wherein,
   said adhesive component (b) is an epoxy resin having a molecular weight between about 200 and about 3000 and an epoxide equivalent between about 130 and about 2000.

4. The invention of claim 1 wherein,
   component (a) includes a resorcinol formaldehyde type resin adhesive and
   component (b) includes an epoxy resin having a molecular weight between about 200 and about 2000 and a nitrogen containing epoxy resin curative for the epoxy resin.

5. A rubber containing product suitable for use as a rubber tire, belt or hose,
   comprising:
   a rubber portion,
   wire means for reinforcing the rubber portion and including at least one metal surface on the wire means,
   an adhesive component in the rubber to promote adhesion between said metal surface and the rubber, said adhesive component consisting essentially of,
      a. methylene acceptor-methylene donor resin reaction product adhesive, and
      b. epoxy resin adhesive and epoxy resin curative reaction product,
   said adhesive component being present in an amount between about 0.1 to about 20 parts per 100 parts of rubber.

6. A rubber like product suitable for use as a tire, belt or hose,
   comprising:
   an elastomeric portion,
   metal means for reinforcing the portion and including at least one metal surface on the metal means,
   an adhesive component in the portion to promote adhesion between said metal surface and the portion, said adhesive component consisting essentially of,
      a. methylene acceptor-methylene donor resin reaction product adhesive, and
      b. epoxy resin adhesive and epoxy resin curative reaction product,
   said adhesive component being present in an amount between about 0.1 to about 20 parts per 100 parts of elastomeric portion.

7. The invention of claim 6 wherein,
   said adhesive component (a) includes a methylene acceptor of metadisubstituted benzene wherein the substitutents are selected from the group consisting of OH, $NH_2$, and $OCOCH_3$,
   and a methylene donor selected from the group consisting of N-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted-1-aza-3,7-dioxabicyclo[3.3.0]octane, trimeric methyleneamino acetonitrile, and an azomethine of the general formula

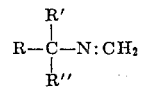

wherein R, R' and R'' are lower alkyl ($C_1$—$C_8$) radicals.

8. The invention of claim 6 wherein,
   said adhesive component (b) is an epoxy resin having a molecular weight between about 200 and about 3000 and an epoxide equivalent between about 130 and about 2000.

9. The invention of claim 6 wherein,
   component (a) includes a resorcinol formaldehyde type resin adhesive and component (b) includes an epoxy resin having a molecular weight between about 200 and about 2000 and a nitrogen containing epoxy resin curative for the epoxy resin.

* * * * *